(12) United States Patent
Diekmeyer et al.

(10) Patent No.: US 9,347,581 B2
(45) Date of Patent: May 24, 2016

(54) DEVICE, METHOD AND SYSTEM FOR COMPRESSED AIR CONTROL AND COMPRESSED AIR SUPPLY

(75) Inventors: Heinrich Diekmeyer, Barsinghausen (DE); Konrad Feyerabend, Hannover (DE)

(73) Assignee: WABCO GmbH, Hannover (DE)

( * ) Notice: Subject to any disclaimer, the term of this patent is extended or adjusted under 35 U.S.C. 154(b) by 354 days.

(21) Appl. No.: 13/698,859

(22) PCT Filed: Mar. 25, 2011

(86) PCT No.: PCT/EP2011/001495
§ 371 (c)(1),
(2), (4) Date: Nov. 19, 2012

(87) PCT Pub. No.: WO2011/160738
PCT Pub. Date: Dec. 29, 2011

(65) Prior Publication Data
US 2013/0062541 A1   Mar. 14, 2013

(30) Foreign Application Priority Data
Jun. 21, 2010  (DE) .......................... 10 2010 024 476

(51) Int. Cl.
| | |
|---|---|
| *F04B 49/22* | (2006.01) |
| *F16K 31/12* | (2006.01) |
| *B60T 13/68* | (2006.01) |
| *B60T 17/00* | (2006.01) |
| *B60T 17/02* | (2006.01) |
| *F04B 49/02* | (2006.01) |

(52) U.S. Cl.
CPC ............... *F16K 31/12* (2013.01); *B60T 13/683* (2013.01); *B60T 17/00* (2013.01); *B60T 17/004* (2013.01); *B60T 17/02* (2013.01); *F04B 49/022* (2013.01); *F04B 49/22* (2013.01)

(58) Field of Classification Search
CPC ........ F04B 49/022; F04B 49/22; B60T 17/02; B60T 13/26
See application file for complete search history.

(56) References Cited

U.S. PATENT DOCUMENTS

| | | | |
|---|---|---|---|
| 6,036,449 A | 3/2000 | Nishar et al. | |
| 7,877,186 B2 | 1/2011 | Detlefs et al. | |
| 7,946,660 B2 | 5/2011 | Diekmeyer et al. | |
| 2010/0036576 A1* | 2/2010 | Diekmeyer et al. | 701/70 |
| 2010/0186827 A1* | 7/2010 | Ertl | 137/115.25 |
| 2011/0052419 A1* | 3/2011 | Bordacs et al. | 417/53 |

FOREIGN PATENT DOCUMENTS

| | | |
|---|---|---|
| DE | 103 57 763 | 3/2005 |
| DE | 103 57 766 | 3/2005 |
| DE | 10 2005 057 004 | 4/2007 |
| DE | 10 2006 020 903 | 4/2007 |
| DE | 10 2005 057 003 | 6/2007 |
| DE | 10 2006 034 762 | 10/2007 |
| WO | WO 2007062750 A1 * | 6/2007 |
| WO | WO 2008/095702 | 8/2008 |

* cited by examiner

*Primary Examiner* — Devon Kramer
*Assistant Examiner* — Kenneth J Hansen
(74) *Attorney, Agent, or Firm* — Kramer Levin Naftalis & Frankel LLP

(57) ABSTRACT

For a vehicle, a compressed air control device controls operating states of a compressor and an air drying device, and includes a compressor control outlet pneumatically connectable to a control inlet of the compressor, a system pressure inlet pneumatically connectable to a system pressure line that conducts a system pressure produced by the compressor, a ventilation control outlet pneumatically connectable to a control inlet of the air drying device and configured to pneumatically switch an operating state of the air drying device, a pneumatically operable ventilation control valve controllable by the system pressure to pneumatically couple the system pressure inlet to the ventilation control outlet to switch the operating state of the air drying device, and an electrically operable supply control valve configured to pneumatically couple the system pressure inlet to the compressor control outlet independently of the system pressure to switch the operating state of the compressor.

18 Claims, 10 Drawing Sheets

DEVICE, METHOD AND SYSTEM FOR COMPRESSED AIR CONTROL AND COMPRESSED AIR SUPPLY

FIELD OF THE INVENTION

The present invention generally relates to a compressed air control device and method that improves the compressed air supply of a vehicle.

BACKGROUND OF THE INVENTION

Compressed air supply systems are used in vehicles, in particular utility vehicles, in order to supply compressed air devices and/or pneumatic systems of the vehicle with compressed air. Such compressed air devices include, for example, a pneumatic suspension unit and a braking unit.

Known compressed air supply systems typically comprise a compressor that provides the compressed air, and an air drying device in which the compressed air provided by the compressor is freed of particles and moisture and/or condensate by air drying material, such as, for example, a filter and a separator, which, if not removed, would otherwise damage the compressed air devices connected thereto and impair the function thereof (for example, the braking action of a braking system).

In such a know pressed air control system, a ventilation control valve to be actuated pneumatically and/or a compressed air control device comprising the ventilation control valve is provided, in order to control operating states of the compressor and the air drying device. Such a ventilation control valve and/or such a compressed air control device is also denoted as a governor. The system pressure provided via the air drying device is guided in a system pressure line to a control inlet of the ventilation control valve. From a predetermined system pressure, the ventilation control valve switches the system pressure via a compressor control line at a control inlet of the compressor and via a ventilation control line at a control inlet of a pneumatic ventilation valve of the air drying device. As a result, firstly, the compressor is switched from a "delivering" operating state into a "holding" operating state, so that the system pressure is not able to be increased further. Secondly, the air drying device is switched from a "delivery" operating state into a "regeneration" operating state, wherein air flows through the air drying material counter to a delivery direction and compressed air is ventilated by the ventilation valve to a vent. In this case, the air drying material are cleaned in a so-called regeneration process and/or flushing process and freed of condensate.

If the system pressure has fallen below a specific limit value, the ventilation control valve switches again so that the ventilation control line and the compressor control line are ventilated by the ventilation control valve to a vent. As a result, ambient air pressure is applied to the control inlets of the compressor and the ventilation valve, wherein the compressor again switches into its "delivering" operating state and the air drying device again switches into its "delivery" operating state.

A drawback with this known compressed air supply system and/or compressed air supply method is that the operating states of the compressor and of the air drying device, depending on a current compressed air requirement of the connected compressed air devices of the vehicle, are adopted at different frequencies and for different lengths of time and thus rather randomly. So-called coasting phases in which the engine driving the compressor is operated without the supply of fuel as a result of the driving mode, for example, when the vehicle is traveling downhill, may not be efficiently utilized in terms of energy. Additionally, after each regeneration of the air drying device, the compressor has to first raise the pressure to the current system pressure in compressed air lines between the compressor and the air drying device and/or the system pressure line and optionally in a compressed air storage tank connected pneumatically to the air drying device, before the system pressure may be increased.

A further compressed air supply system is disclosed in U.S. Pat. No. 6,036,449 A, which differs from the compressed air supply system described above in that an electrically actuatable ventilation control valve is provided instead of the pneumatically actuatable ventilation control valve. As a result, the fixed limits at which the ventilation control valve is switched, are lilted. In particular, an electronic control device may subject the ventilation control line and the compressor control line to the system pressure, or ventilate the two control lines, irrespective of the respective system pressure. The compressed air supply system of U.S. Pat. No. 6,036,449 A thus permits a more flexible control of the regeneration of the air drying device.

The compressed air supply system of U.S. Pat. No. 6,036,449 A, however, has numerous drawbacks. In particular, the compressed air supply system and the above-mentioned compressed air supply system with the ventilation control valves, which may be actuated pneumatically, have a high energy consumption since the compressor has to be operated frequently and for lengthy periods by the engine of the vehicle in order to build an air pressure again (e.g., in the compressed air line that leads from the compressor to the air drying device) to the system pressure after the regeneration of the air control device, before the system pressure may be further increased.

SUMMARY OF THE INVENTION

Generally speaking, it is an object of the present invention to provide a compressed air control device and method for controlling respective operating states of a compressor and an air drying device.

According to an embodiment of the present invention, he compressed air control device includes a compressor control outlet pneumatically connectable to a control inlet of the compressor, a system pressure inlet pneumatically connectable to a system pressure line that conducts a system pressure produced by the compressor, a ventilation control outlet pneumatically connectable to a control inlet of the air drying device and configured to pneumatically switch an operating state of the air drying device, a pneumatically operable ventilation control valve controllable by the system pressure to pneumatically couple the system pressure inlet to the ventilation control outlet to switch the operating state of the air drying device, and an electrically operable supply control valve configured to pneumatically couple the system pressure inlet to the compressor control outlet independently of the system pressure to switch the operating state of the compressor. According to another embodiment, in addition to the ventilation control valve, the compressed air control device also includes an electrically actuatable supply control valve for switching the operating state of the compressor, where the system pressure inlet can be connected pneumatically to the compressor control outlet irrespective of the system pressure. As a result, the compressor control line can be subjected to the system pressure even when the system pressure is not yet sufficient for switching the ventilation control valve. Different pressures may prevail in the compressor control line and in the ventilation control line, therefore, so that the compressor can be switched off and/or switched to a "holding" operating state without a regeneration process and/or flushing process being simultaneously triggered in the air drying device. The compressed air control device may naturally have more than one system pressure inlet. Also, a plurality of other components may optionally be provided.

If the system pressure drops, the compressor may be switched again into the "delivering" operating state by switching the supply control valve and venting the compressor control line via the supply control valve to increase the system pressure. In this case, however, the compressor does not have to use any energy for creating compressed air as would be the case after a venting procedure. In particular, the compressor being is switched on is able to increase the system pressure immediately without the system pressure first having to have been previously built up in the flushed and thus vented air drying device, thus permitting an energy-saving compressed air supply by intelligent activation of the compressor and the air drying device, in particular by activating the compressor, irrespective of the system pressure.

A build-up of pressure of the system pressure can be started and finished in a flexible and rapid manner. In particular, for a relatively small pressure increase, the compressor may be switched on for a relatively short length of time, and optionally this may be repeated several times according to requirements, wherein the system pressure is able to be increased immediately or after a very short period of time, as it is not necessary to compensate for pressure losses of a potential flushing process.

Additionally, an effective flushing of the air drying device and/or the air drying material is achieved in the air drying device, which may be adapted to the requirements of actual or assumed formation of condensation and/or soiling.

According to one embodiment, the compressor can advantageously be switched off in a flexible manner, whilst, for example, a gasoline engine which drives the vehicle and the compressor is started up. Thus, the start-up process of the engine is facilitated. Additionally, the compressor may be temporarily switched off if maximum power of the engine is to he called upon for operating the engine of the vehicle.

Moreover, fuel can be conserved, which provides the enemy for driving the engine and thus for operating the compressor. By optimized flushing and shorter running times of the compressor, the lifetime of the compressor and optionally further compressed air devices of the vehicle is additionally increased, these being particularly well protected from water in the compressed air and thus, for example, from corrosion damage due to the optimized flushing.

According to a other embodiment, a method for operating the compressed air control device is provided. In particular, the electrically actuatable supply control valve of the compressed air control device switches the operating state of the compressor by connecting the system pressure inlet pneumatically to the compressor control outlet irrespective of the system pressure, or by shutting off the system pressure inlet from a connection to the system pressure inlet irrespective of the system pressure.

The ventilation control valve is preferably a pneumatically actuatable valve. In this case, the ventilation control valve may still be actuated pneumatically even in the event of an electronic malfunction and/or failure of the ability to be electrically activated.

Alternatively, the ventilation control valve is an electrically actuatable valve. In this case, limit values at which the ventilation control valve is intended to be switched, may be adjusted very finely and optionally altered.

The ventilation control valve is preferably arranged separately from the air drying device. In particular, a structural unit that comprises the compressed air control device or parts of the compressed air control device comprising the ventilation control valve, is arranged separately from a further structural unit that comprises the air drying device. The two units are not directly connected together and thus also not flanged together. In particular, the units are installed at different points on the vehicle and/or vehicle chassis.

Preferably, the supply control valve comprises two switching states. In the case of a first switching state, the supply control valve connects the compressor control outlet to the ventilation control outlet of the compressed air control device or to a vent. In the case of a second switching state, however, the supply control valve connects the compressor control outlet pneumatically to the system pressure inlet of the compressed air control device. This occurs, in particular, in each case irrespective of the system pressure so that, irrespective of a switching position of the ventilation control valve, the compressor control line can optionally be subjected to the system pressure.

In an advantageous embodiment, a pressure sensor is provided in the compressed air control device to detect the system pressure. To this end, the pressure sensor is connected pneumatically to the system pressure inlet. Preferably, the detected system pressure is used as a parameter for an electrical activation of the supply control valve. As a result, depending on the respective system pressure, a decision can be made as to which operating state the compressor is to adopt. For example, the system pressure may thus be regulated, wherein the system pressure is kept at a defined pressure interval which may be altered depending on further parameters, in particular may be shifted, increased, and/or reduced. Alternatively, the pressure sensor is an external pressure sensor that is connected to the system pressure line.

The compressed air control device is preferably configured as a complete structural unit or comprises a first structural unit with the ventilation control valve and a second structural unit with the supply control valve which may be mechanically and pneumatically connected to the first unit. In particular, the air drying device is a separate unit, which may not be integrated with the compressed air control device, but may preferably be installed at a different point on the vehicle. As a result, a conventional air drying device may be used.

In an advantageous embodiment, the compressed air control device is configured such that it may be fastened to the compressor, in particular flanged thereto. In the event that the compressed air control device comprises the two aforementioned structural units, preferably the second structural unit which comprises the supply control valve may be flanged to the compressor. This is advantageous as the supply control valve is intended to be connected via the compressor control line to the compressor, wherein such a pneumatic connection may be easily created by flanging the second unit or the entire unit to the compressor.

In the event that the compressed air control device comprises the two structural units, the first unit is preferably fastened to the second unit, in particular flanged thereto. Thus a compact arrangement of the compressor and compressed air control device is produced.

According to an embodiment, the electronic control device is provided for controlling one or more respective operating states of the compressor and the air drying device by means of the compressed air control method According to another embodiment, the electronic control device is provided to permit compressed air control by means of the compressed air control device.

To this end, the electronic control device comprises a decision component, by which it determines a first decision, namely as to whether the air drying device is to adopt a "delivery" operating state, or a "regeneration" operating state. Moreover, the decision component determines a second decision by using the first decision, namely as to whether the compressor is to be left in a "delivering" operating state or in a "holding" operating state or switched to the respective other operating state.

Preferably, the electronic control device comprises a supply control valve activator that actuates the supply control valve according to the second decision. Thus, by means of an electrical signal, the supply control valve is, for example, moved into a state supplied with current in order to increase the pressure in the compressor control line, at least sufficiently for the compressor to be switched off or switched into a "holding" operating state.

According to one embodiment, the electronic control device can be configured to effect the compressed air control method.

The electronic control permits, therefore, an intelligent control of the operating states of the compressor and the air drying device by taking the system pressure into account.

In an advantageous embodiment, the electronic control device further comprises a storage that stores a time curve of the system pressure and/or switching states of the supply control valve, wherein the decision component preferably uses the time curve for determining the respective decision.

Preferably, the decision is made as to whether the air drying device is to he switched from a "delivery" operating state to increase the system pressure into a "regeneration" operating state to flush the air drying device. Preferably, the decision component of the electronic control device implements the decisions.

In the event that it is intended to switch into the "regeneration" operating state, the supply control valve is activated by the supply control valve activator such that it is left in its first switching state, in particular until a switching threshold of the ventilation control valve is reached. Otherwise, the supply control valve is activated such that it is switched into its second switching state, as soon as the system pressure reaches or exceeds an upper limit value. The limit value may be a predetermined and/or established, adjustable or learned limit value. Preferably, the upper limit value lies below the switching threshold of the ventilation control valve.

Subsequently, the supply control valve is activated, preferably such that the supply control valve is left for a maximum length of time in the second switching state until the system pressure reaches or falls below a lower limit value.

Preferably, the supply control valve is also already switched into its first switching state even at a system pressure above the lower limit value, when the decision is made that it is to be switched to the "regeneration" or "delivering" operating state. In particular when a coasting phase is identified, for utilizing the available energy, the compressor is preferably shifted into the "delivering" operating state. A coasting phase is present in the context where no fuel is consumed and/or an engine load, in particular an engine load signal present on the CAN bus, is zero. Also, for triggering the regeneration, the compressor has to be switched on in order to build the system pressure for switching the ventilation control valve.

The second switching state of the supply control valve is preferably a switching state supplied with current, whereas the first switching state is a switching state not supplied with current. In the case of a current failure and/or malfunction of the electronic control device, the compressor can thus still be switched pneumatically, wherein the energy-saving advantages are not achieved, but wherein an operation of the vehicle and/or of the supplied compressed air devices of the vehicle is able to be maintained.

Preferably, the compressor is switched on and/or shifted into the "delivering" operating state at the latest when the pressure reaches or falls below a lower limit value. This is preferably achieved by switching the supply control valve into its first switching position.

Preferably, the system pressure is kept in a pressure range between the upper value and the lower limit value. This is preferably achieved by the compressor alternately adopting the "delivering" and "holding" operating states, in particular depending on at least one vehicle state. Such a vehicle state is, for example, a rotational speed of the engine, a vehicle speed and/or an engine load, in particular load-free operation of the engine in coasting phases. Preferably, the compressor is switched depending on several of these vehicle states by means of the supply control valve.

In an advantageous embodiment, the electronic control device is integrated in an engine control device for electronic control of an internal combustion engine. This is advantageous as in any case the compressor is arranged in the spatial vicinity of the internal combustion engine, and thus preferably the compressed air control device and/or the second structural unit of the compressed air control device with the supply control valve is also arranged in the spatial vicinity of the engine. Thus, additional control electronics do not have to be provided, which saves costs.

Additionally, engine parameters may be advantageously taken into account by the electronic control device integrated in the engine control device when the compressor is controlled, in particular activated. For example, the electronic control device can he configured so that, when starting the engine, the compressor is left in its "holding" operating state in order not to load the engine by the production of compressed air, in order to simplify the start-up process thereby. Moreover, the electronic control device may ensure that the compressor is switched into its "holding" operating state or left in the "holding" operating state when power surges of the engine are required, for example, for maximum acceleration of the vehicle. This advantageously influences the operating behavior and/or driving behavior of the vehicle, in this case, parameters may be taken into account which are present in the engine control device, naturally even when the electronic control device is provided and/or arranged separately from the engine control device, for example, by a data line being provided between the engine control device and the electronic control device.

According to one embodiment, a compressed air supply system is provided for a vehicle, in particular a utility vehicle. The compressed air supply system comprises the compressed air control device and the electronic control device described above. The supply control valve may be electrically activated by means of the control device. Moreover, the compressed air supply system comprises a compressor, the control inlet thereof being pneumatically connected to the compressor control outlet of the compressed air control device. Moreover, the compressed air supply system comprises a system pressure line which may be supplied with compressed air from the compressor. The system pressure line preferably comprises at least one connector for at least one compressed air device, for example, a pneumatic suspension unit or a braking unit, of the vehicle. The system pressure line is pneumatically connected to the system pressure inlet of the compressed air control device. Finally, the compressed air supply system comprises an air drying device that is pneumatically connected to a compressed air outlet of the compressor and to the system pressure line. The system pressure line may be supplied by the air drying device with compressed air from the compressor so that the compressed air provided by the compressor reaches the system pressure line filtered and/or free of condensate.

According to one embodiment, a corresponding compressed air supply method for a vehicle is provided, wherein the electronic control device electrically activates the supply control valve, wherein the compressor is controlled via a pneumatic connection of its control inlet to the compressor control outlet of the compressed air control device, wherein the system pressure line is supplied with compressed air from the compressor, wherein the system pressure line supplies at least one compressed air device of the vehicle with compressed air via at least one connector, and wherein the system pressure line supplies the system pressure via the system pressure inlet of the compressed air control device. The system pressure line is thus supplied by the air drying device with compressed air from the compressor.

The air drying device preferably comprises air drying material and a pneumatically actuatable ventilation valve, the control inlet thereof being pneumatically connected to the ventilation control line and by means of which, depending on the pressure in the ventilation control line, a ventilation line may be connected to a vent or may be shut off from the vent. In particular, the control inlet of the air drying device is provided by the control inlet of the ventilation valve. In the "delivery" operating state of the air drying device, compressed air flows through air drying material of the air drying device in a delivery direction, and the air drying material filters moisture out of the compressed air. The air drying material may thus be, for example, a filter and a separator arranged downstream in the delivery direction.

The compressed air supply device further comprises a pneumatically actuatable ventilation valve, the control inlet thereof being pneumatically connected to the ventilation control line and by means of which, depending on the pressure in the ventilation control line, a ventilation line may be connected to a vent or may be shut off from the vent. In the "delivery" operating state, the ventilation valve is pneumatically activated via its control connector such that the ventilation valve shuts off the ventilation line from the vent. In this case, the air drying material can he used for cleaning and/or dehumidifying the compressed air in the delivery mode.

In the "regeneration" operating state of the air drying device, however, air flows through the air drying material for flushing in a regeneration direction oriented counter to the delivery direction. This takes place by the ventilation valve being pneumatically activated via the ventilation control line by the compressed air control device, such that the air drying material are vented by the ventilation line to the vent. As a result, a flushing and/or a regeneration of the air drying device is permitted, wherein collected particles and/or condensate are blown out with compressed air to the vent, counter to the delivery direction.

The compressed air for flushing the air drying material is thus preferably supplied by a flushing air supply line. The flushing air supply line is connected via a flushing air connector to a connecting line and via the connecting line to the air drying material. The connecting line thus connects the air drying material to the system pressure line.

In order to prevent an escape of compressed air from the system pressure line during regeneration and/or to counteract the escape of compressed air, moreover, a non-return valve is provided in the connecting line between the flushing air connector and the system pressure line. The non-return valve is preferably part of the air drying device, but can also optionally be arranged separately, downstream of the air drying device, in or upstream of the system pressure line.

In the flushing air supply line, a diaphragm is preferably arranged which defines a throughflow of compressed air, so that compressed flushing air does not escape abruptly.

The compressed flushing air is preferably provided from a compressed air storage tank which is connected pneumatically to the flushing pressure line. In an alternative embodiment, the flushing pressure line is pneumatically connected to the ventilation control line and/or to an outlet of the ventilation control valve, via which the ventilation control line is also supplied. This outlet of the ventilation control valve and/or the ventilation control line are in this case, therefore, preferably designed with cross sections and/or diameters which are able to supply the compressed air for flushing. In particular, a cross section of the pneumatic line and/or components and/or the ventilation valve is provided from the system pressure line to the flushing air connector, which is not smaller than a cross section and/or diameter of the diaphragm in the flushing pressure line.

In an alternative embodiment, the flushing pressure line is connected to the system pressure line, wherein the air drying device, in particular, is configured accordingly. In this case, the system pressure line can be shut off from the flushing pressure line by a pneumatic regeneration control valve. In this case, the regeneration control valve, in addition to the ventilation valve, is also switched by the ventilation control line.

According to another embodiment, a vehicle, in particular a utility vehicle, comprises one or more of the compressed air supply device, the electronic control device, the compressed air supply system, and one or more devices for carrying out the compressed air control method. The vehicle further comprises at least one compressed air device, for example, a compressed air braking unit or a compressed air suspension unit, which may be supplied with compressed air via at least one connector to the system pressure line.

Still other objects and advantages of the present invention will in part be obvious and will in part be apparent from the specification.

The present invention accordingly comprises the features of construction, combination of elements, arrangement of parts, and the various steps and the relation of one or more of such steps with respect to each of the others, all as exemplified in the constructions herein set forth, and the scope of the invention will be indicated in the claims.

BRIEF DESCRIPTION OF THE DRAWINGS

Exemplary embodiments of the invention will be explained in more detail below with reference to the accompanying drawings, in which.

DETAILED DESCRIPTION OF THE PREFERRED EMBODIMENTS

Figure 1:
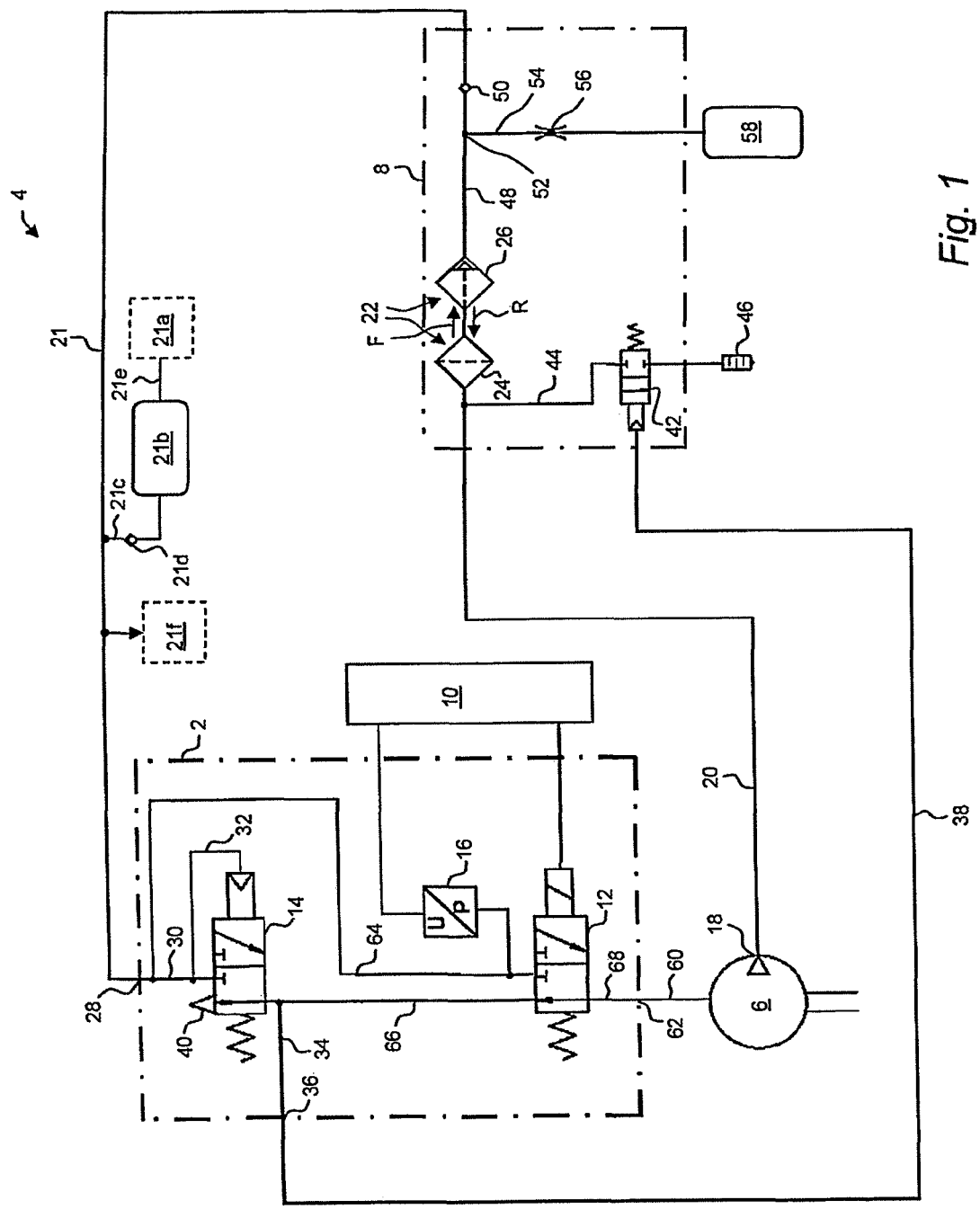
FIG. 1 shows a circuit diagram of a compressed air supply system including a compressed air control device according to a first exemplary embodiment of the invention.

FIG. 1 shows a circuit diagram of a compressed air supply system 4 that includes a compressed air control device 2 according to an embodiment of the invention, by means of which a compressed air control method may optionally be carried out via additional components of the compressed air supply system. The compressed air supply system additionally has a compressor 6 and an air drying device 8.

The compressed air control device 2 is activated by an electronic control device 10. In particular, the compressed air control device 2 comprises an electrically actuatable supply control valve 12 which may be electrically activated by the electronic control device 10 for switching from a switching state with no current applied to one with current applied. Moreover, the compressed air control device 2 comprises a so-called governor and/or a pneumatically actuatable ventilation control valve 14, which may also alternate between two switching states, but via pneumatic actuation rather than electrical. Finally, the compressed air control device 2 further comprises a pressure sensor 16 that transmits electrical signals to the electronic control device 10 according to detected pressures.

The control device 10 is in this case shown outside the compressed air control device 2. In particular, the control device 10 can be integrated in an electronic engine control unit for controlling an engine that also drives the compressor 6. Alternatively, the electronic control device 10 can also be configured as a separate module or, for example, integrated in the compressed air control device 2, or even in the air drying device 8.

The compressor 6 comprises an outlet 18 for providing compressed air. The compressed air generally comprises moisture which is able to condense on pressure lines, in particular when said compressed air, which initially leaves the compressor 6 relatively warm, cools. Thus, the compressor 6 is initially connected by the outlet 18 and by a compressed air line 20 to the air drying device 8 and only via the air drying device 8 to a system pressure line 21, which conducts the system pressure generated by the compressor 6. The system pressure line 21 provides the system pressure to symbolically indicated compressed air devices 21a of a vehicle comprising the compressed air control device 2, preferably via at least one compressed air storage tank 21b. Such compressed air devices 21a may be pneumatic systems of the vehicle such as a compressed air-operated braking unit and/or a pneumatic suspension system. A non-return valve 21d optionally arranged upstream of the compressed air storage tank 21b in a compressed air line 21c counteracts a return flow of compressed air from the compressed air storage tank 21b into the system pressure line 21, so that the compressed air devices can also be supplied, via a compressed air line 21e tor a further period of time, with compressed air from the compressed air storage tank 21b if the system pressure in the system pressure line 21 should fall due to a defect. In particular for supplying braking devices, a multicircuit protection valve, not shown, may also be provided. Alternatively or additionally to the devices 21a to 21e, consumers 21f may be provided which are supplied via the system line 21 with compressed air.

The air drying device 8 comprises air drying material 22 for air drying. In the exemplary embodiment shown, the air drying material 22 includes a filter 24 and a separator 26 arranged downstream of the filter 24. Alternatively, however, other air drying material 22 may also be provided which free the compressed air provided by the compressor 6 of condensate and/or particles and/or fluid or filter out or separate at leas parts thereof, when air flows through them in a delivery direction F.

The system pressure prevailing in the system pressure line 21 is supplied to the compressed air control device 2. To this end, the compressed air control device 2 comprises a system pressure inlet 28 pneumatically connected to the system pressure line 21 The system pressure is supplied by a compressed air line 30 to the ventilation control valve 14. Additionally, the system pressure is supplied by a control line 32 to a control inlet of the ventilation control valve 14. At a system pressure which lies below a specific value, the ventilation control valve 14 shuts off, by means of the force of a spring, the compressed air line 30 relative to a compressed air line 34 and/or the system pressure 28 relative to a ventilation control outlet 36 and a ventilation control line 38 leading to the air drying device 8. The ventilation control line 38 is ventilated and/or becomes ventilated in this switching position of the ventilation control valve 14 at a ventilation outlet 40.

The ventilation control line 38 is pneumatically connected to a control inlet of the air drying device 8 and/or a ventilation valve 42 and/or a so-called PURGE valve, so that the ventilation valve 42, and thus an operating state of the air drying device 8, can be switched by means of the ventilation control valve 14. When the ventilation control line 38 is ventilated and/or when the pressure at the control inlet of the ventilation valve 42 lies below a predetermined limit value, the ventilation valve 42 shuts off a ventilation line 44 by means of the force of a spring, relative to a vent 46, which is indicated by a sound absorber arranged upstream of the vent 46, the ventilation line 44 being pneumatically connected to the compressed air line 20. The air drying device 8 is in the "delivery" operating state.

If the system pressure in the system pressure line 21 rises to a limit value that is sufficient for switching the ventilation control valve 14 counter to the force of a spring of the ventilation control valve 14, the ventilation control valve 14 changes from a first switching state to a second switching state in which the ventilation control line 38 is no longer pneumatically connected to the ventilation outlet 40, but via the compressed air line 30 to the system pressure inlet 28. This has the result that the system pressure is also adjusted in the ventilation control line 38 and, to counteract this, the ventilation valve 42 of the air drying device 8 also switches against the force of its spring into a different switching state in which the ventilation line 44 is pneumatically connected to the vent 46. The air drying device 8 is now in the "regeneration" operating state.

The air drying material 22 are connected to the system pressure line 21 by a connecting line 48 in which a non-return valve 50 is arranged. The non-return valve 50 counteracts a ventilation of the system pressure line 21 through the ventilation valve 42.

Flushing air is instead drawn via a flushing air connector or flushing air inlet 52 arranged between the air drying material 22 and the non-return valve 50 in the connecting line 48. A flushing air supply line or flushing air line 54 is connected to a diaphragm 56 at the flushing air inlet 52. Flushing air in this exemplary embodiment is drawn from a compressed air storage tank 58, which is connected to the flushing air line 54 and throttled by the diaphragm 56, flowing through the air drying material 22 in a regeneration direction R, and can be vented through the ventilation control valve 42. In the "delivery" operating state of the air drying device 8, the compressed air storage tank 58 is periodically filled again.

During the regeneration and/or flushing of the air drying device 8, the compressor 6 does not provide further compressed air, which is the case even in the event of failure of the activation of the supply control valve 12. Specifically when the system pressure prevails in the ventilation control line 38, the system pressure in this exemplary embodiment is also always present in a compressor control line 60, which connects a compressor control outlet 62 pneumatically to a control inlet of the compressor 6. The control pressure in this compressor control line 60 determines whether the compressor 6 is in a "holding" operating state or a "delivering" operating state. If the control pressure in the compressor control line 60 reaches or exceeds a specific limit value, the compressor 6 switches into its "holding" operating state so that the pressure in the compressed air line 20 is not increased further.

The system pressure is supplied via a compressed air line 64 to the supply control valve 12. The system pressure is measured by a pressure sensor 16 connected to the compressed air line 64. When the ventilation control valve 14 is in its second switching state for switching the air drying device into the "regeneration" operating state, and thus the system pressure prevails in the compressed air line 34, the system pressure also prevails in a compressed air line 66, which pneumatically connects the outlet of the ventilation control valve 14 to a further inlet of the supply control valve 12. Thus in this case the system pressure prevails both in the compressed air line 64 and in the compressed air line 66 so that, irrespective of the switching position in which the supply control valve 12 is located, the system pressure is guided via a compressed air line 68 from an outlet of the supply control valve 12 to the compressor control outlet 62. Thus the delivery through the compressor 6 is suppressed when the air drying device 8 is in the regeneration mode and/or is flushed.

By means of the pressure sensor 16 and the electronic control device 10, it may be determined that the control pressure rises and reaches a limit value that is not yet sufficient for switching the ventilation control valve 14. In this case, when the electronic control device decides that currently no regeneration of the air drying device 8 is to be carried out and there is no current pressure requirement in the system pressure line 21, it electrically activates the supply control valve 12 so that the supply control valve 21 connects the compressed air line 64 to the compressed air line 68 and/or conducts the system pressure to the control inlet of the compressor 6, although the ventilation control line 38 to the air drying device 8 is still ventilated. As a result, the delivery mode of the compressor 6 is switched off, so that the system pressure is not further increased and at the same time energy is saved. The air drying device 8 is not switched to regeneration mode as the system pressure required therefor is not reached. In the case of a pressure drop detected by the pressure sensor 16, the compressor 6 may then be switched again into its delivery mode, wherein shortly the system pressure rises in the system pressure line 21, as the system pressure also still prevails in the compressed air line 20, in the air drying device 8, and in the compressed air storage tank 58.

If an operation of the engine without the supply of fuel and/or at zero engine load is detected and/or received as a signal, this is identified as a coasting phase. Also, as a response to this identified coasting phase, the control device 10 switches the supply control valve 12 into its first switching position so that the compressor control line 60 is ventilated and the compressor 6 is shifted into delivery mode. In this manner, the energy available to the engine may be efficiently used for the pressure supply.

After regeneration of the air drying device 8, however, pressure has to be initially built in the compressed air line 20, in the connecting line 48 as far as the non-return valve 50 and in the compressed air storage tank 58, before the non-return valve 50 allows compressed air to pass to the system pressure line.

The compressed air control device 2 in this exemplary embodiment is designed as a complete structural unit. In particular, the supply control valve 12 and the ventilation control valve 14 are accommodated in a common housing. The housing is flanged to a housing of the compressor 6. For example, the housings are screwed together, wherein they are connected together pneumatically in the region of the compressor control outlet 62. In particular, there may be a connection of the compressor control outlet 62, sealed, for example, by a sealing ring to the control inlet of the compressor 6 and/or to the compressor control line 60.

Figure 2:
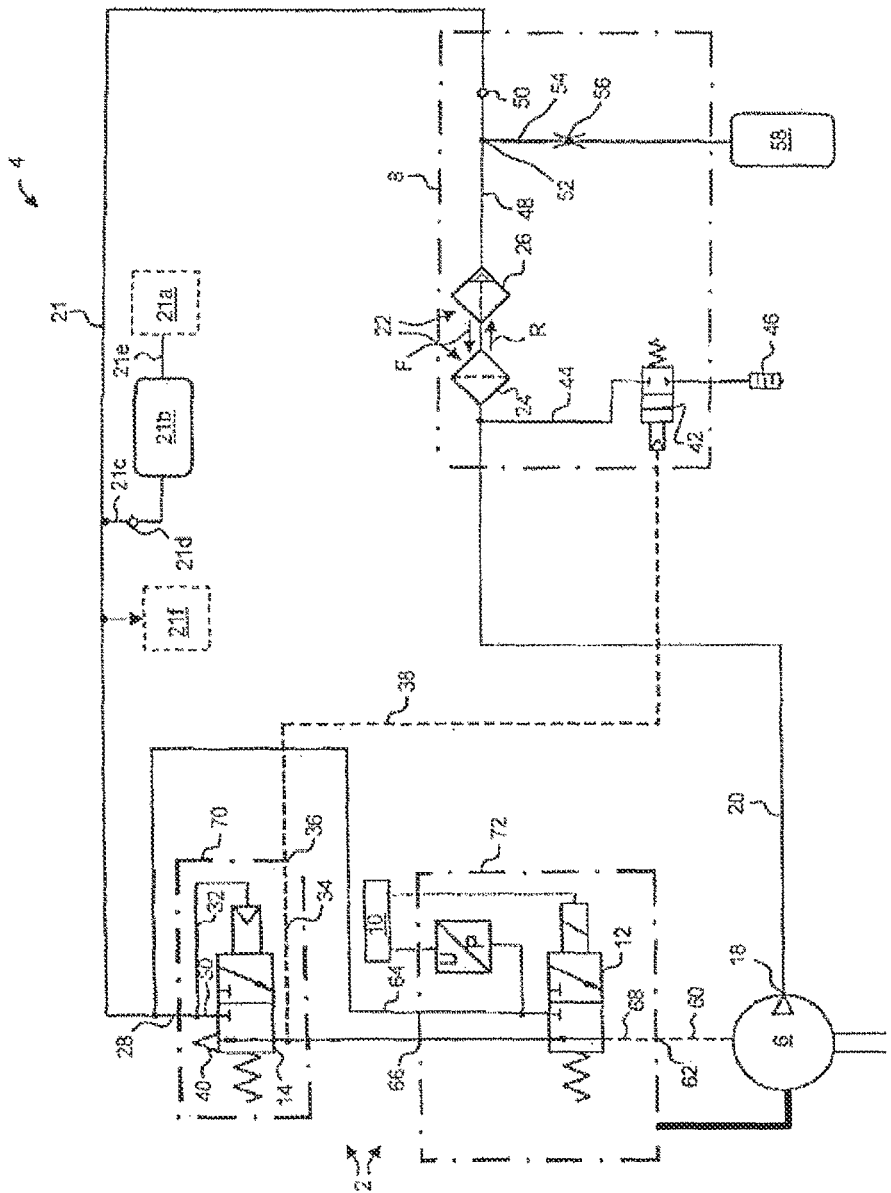
FIG. 2 shows a circuit diagram of a compressed air supply system including the compressed air control device of FIG. 1 having a different structural arrangement according to a second exemplary embodiment of the invention.

FIG. 2 shows a circuit diagram of a compressed air supply system with the compressed air control device of FIG. 1 having a structurally different arrangement. In particular, the compressed air control device 2 in this second exemplary embodiment is not designed as a complete structural unit, but comprises a first structural unit 70 comprising the ventilation control valve 14 and a second structural unit 72 comprising the supply control valve 12. The units 70 and 72 are nevertheless preferably arranged in the spatial vicinity of one another, quite preferably evenly flanged to one another, so that the compressed air lines 66 are guided via a flange connection from the first unit 70 to the second unit 72. The compressed air line 64 is in this case directly connected to the system pressure line 21, but alternatively may also discharge into the first unit 70, in particular via a flange connection, and be connected there to a compressed air line conducting the system pressure. Otherwise, the second exemplary embodiment is the same as the first exemplary embodiment. In particular, the same reference numerals denote the same components or components with at least the same functionality. Also in all other exemplary embodiments, the same reference numerals denote the same components or components with at least the same functionality.

Figure 3:
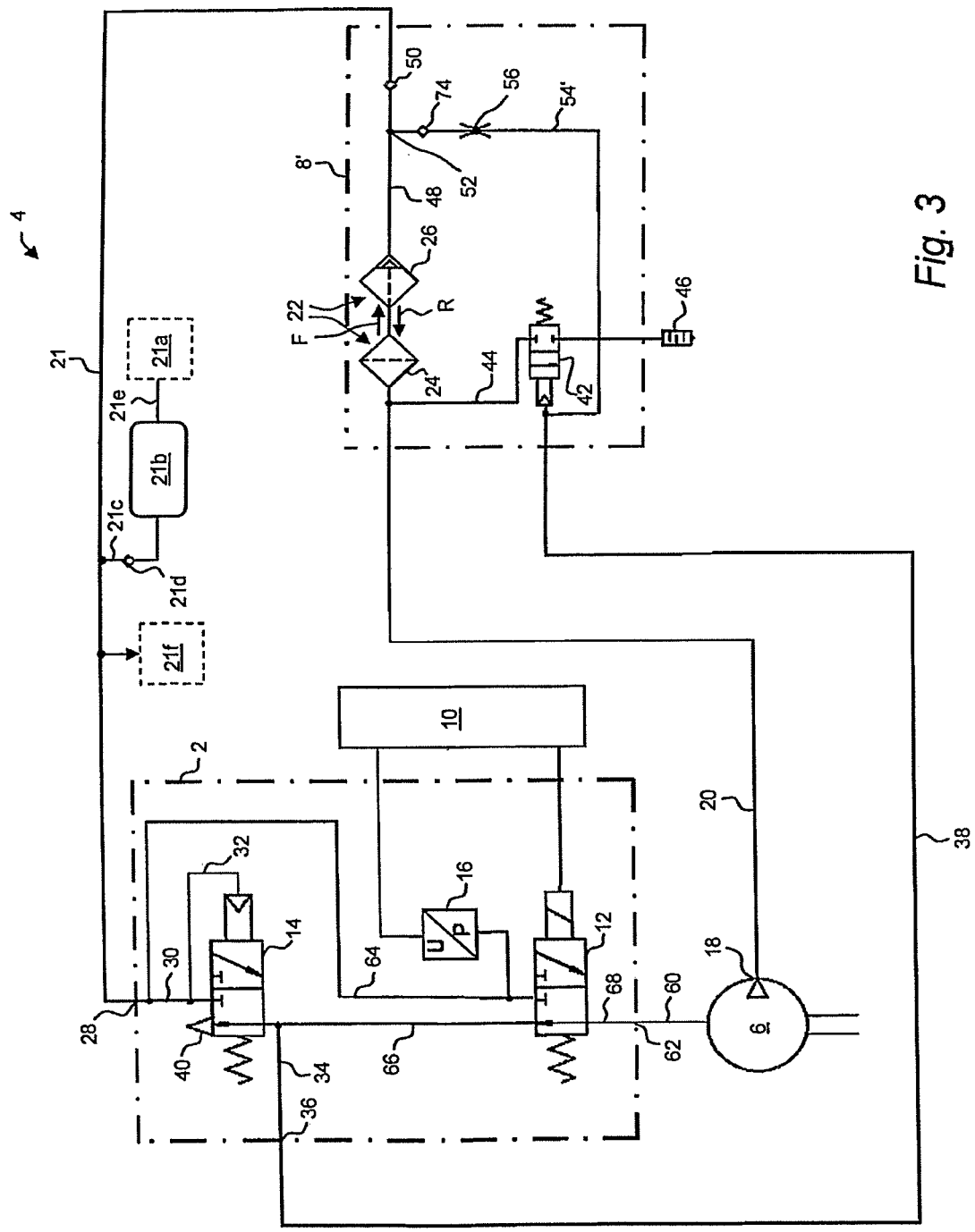
FIG. 3 shows a circuit diagram of a compressed air supply system including the compressed air control device of FIG. 1 and a differently configured air drying control device according to a third exemplary embodiment of the invention.

FIG. 3 shows a circuit diagram of a compressed air supply system comprising the compressed air control device of FIG. 1, but with an air drying device 8' configured differently from the air drying device 8 of FIG. 1. In particular, instead of the flushing air line 54 guided to the compressed air storage tank 58, a flushing air line 54' is provided, which connects the flushing air inlet 52 via an additional non-return valve 74 and the diaphragm 56 to the ventilation control line 38. The ventilation control line 38 and connectors, in particular the outlet, of the ventilation control valve 14 are therefore correspondingly preferably of larger dimensions compared to the exemplary embodiment of FIG. 1, so that a sufficiently large amount of air per time unit may be provided for flushing the air drying device 8' and/or the air drying material 22.

Figure 4:
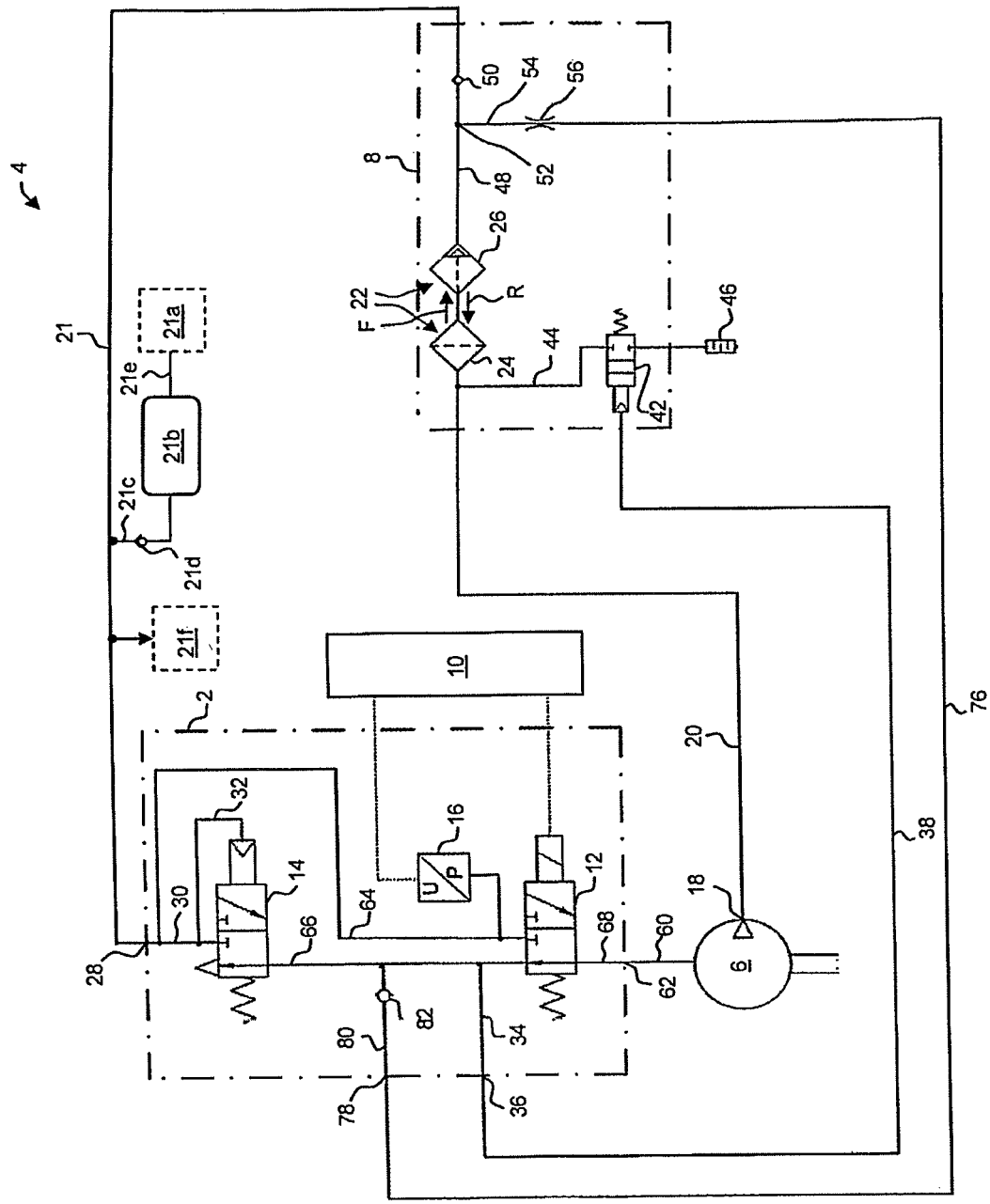
FIG. 4 shows a circuit diagram of a compressed air supply system including a compressed air control device and with an air drying device with the same function as that shown in FIG. 3 according to a fourth exemplary embodiment of the invention.

FIG. 4 shows a circuit diagram of a compressed air supply system having a compressed air control device according to a fourth exemplary embodiment of the present invention, which is similar in function to that in the exemplary embodiment of FIG. 3. in this fourth exemplary embodiment, however, the air drying device 8 of the first exemplary embodiment of FIG. 1 is provided. However. the flushing air line 54 is not connected to a compressed air storage tank 58, but is conducted via a compressed air line 76 to an outlet 78 of a compressed air control device 2'. The compressed air line 66 is pneumatically connected, via a compressed air line 80 which comprises a non-return valve 82, to the outlet 78. The non-return valve 82 fulfills the same function as the non-return valve 74 of FIG. 3, namely counteracts a discharge of compressed air from the flushing air inlet 52 through the flushing air line 54 and/or 54'.

Figure 5:
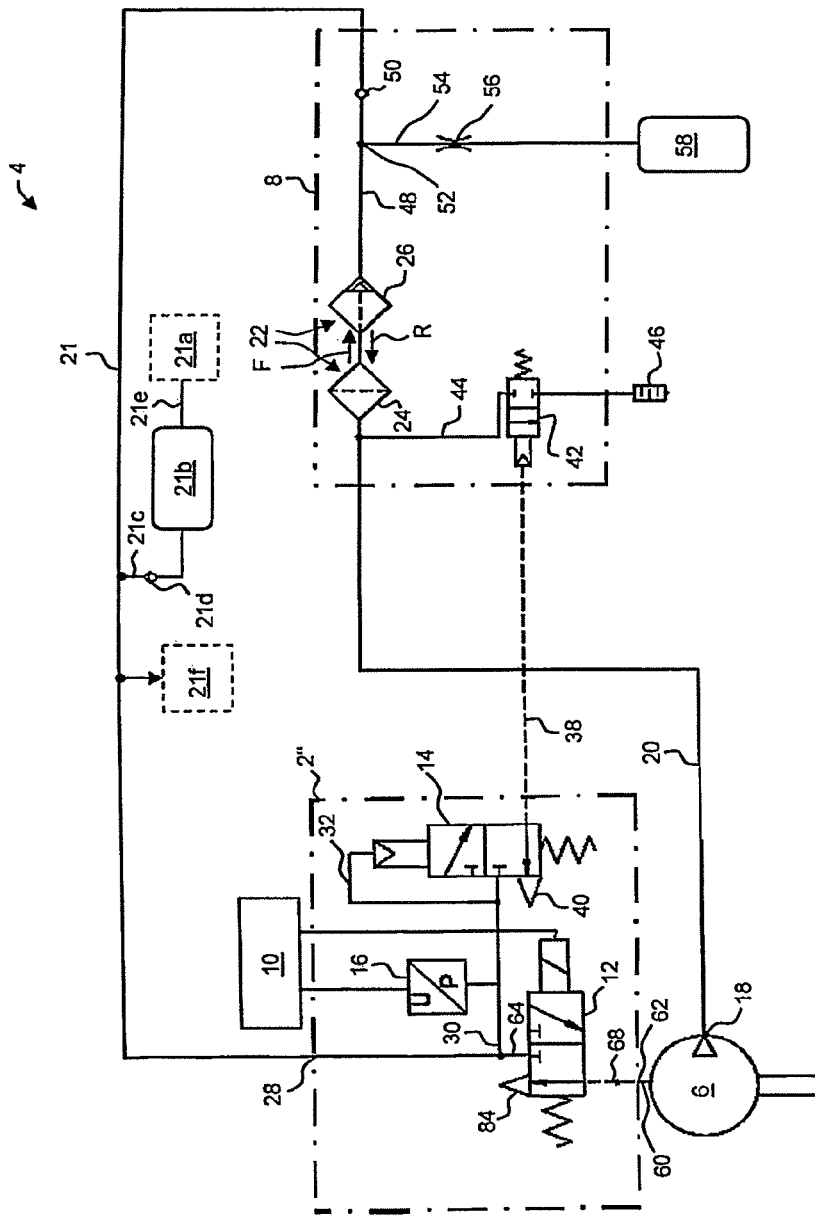
FIG. 5 shows a circuit diagram of a compressed air supply system including a compressed air control device with a different function relative to the compressed air control device of FIG. 1, according to a fifth exemplary embodiment of the invention.

FIG. 5 shows a circuit diagram of a compressed air supply system having a compressed air control device 2" according to a fifth exemplary embodiment of the present invention, wherein the compressed air control device 2" has a different functionality relative to the compressed air control device 2 of FIG. 1, In particular, the supply control valve 12, in the state not supplied with current, connects the control inlet of the compressor 6, not as in the first exemplary embodiment to the compressed air line 66 and/or to the ventilation control outlet 36, but to a vent 84, so that the compressor 6 may be ventilated independently of a switching position of the ventilation control valve 14 and independently of the system pressure by ventilating the compressor control line 60 to the vent 84. Also in the case of a malfunction of the control device 10, ventilation takes place so that the compressor 6 is continuously delivering.

Figure 6:
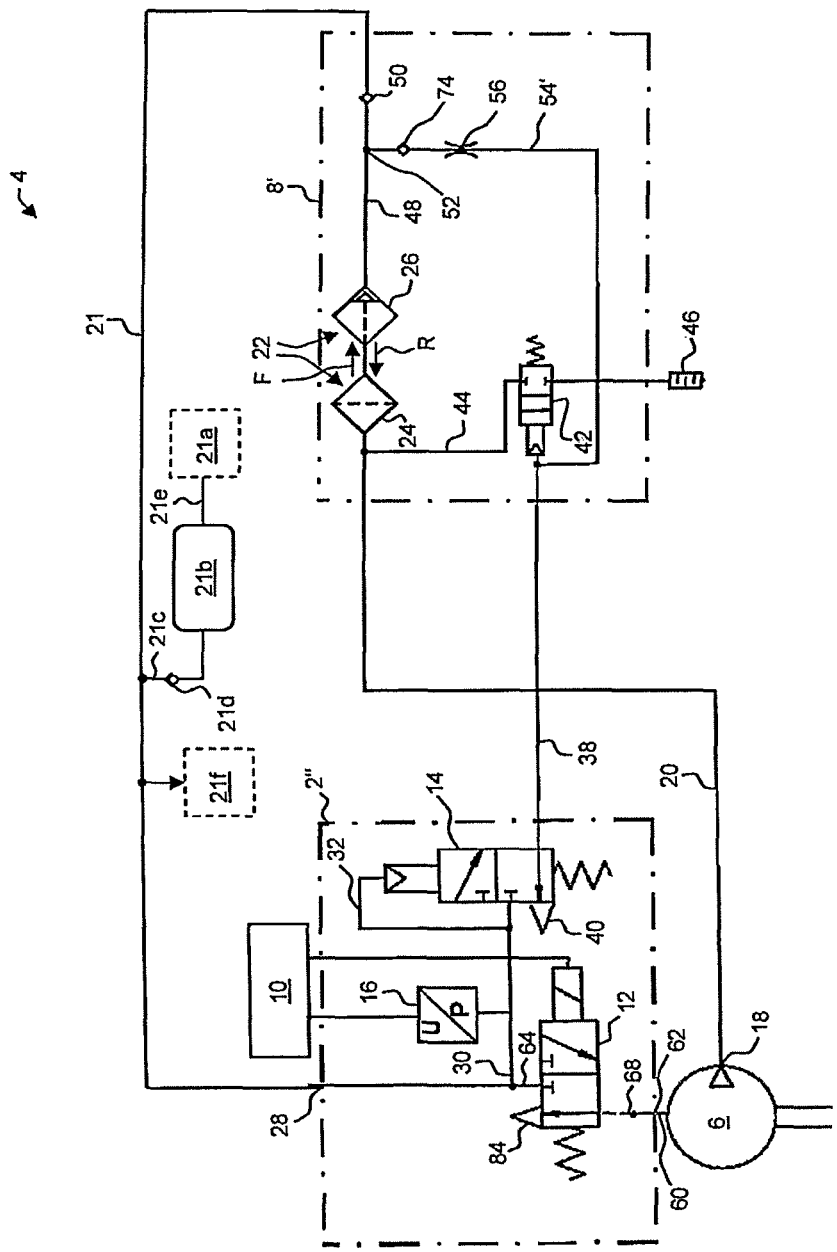
FIG. 6 shows a circuit diagram of a compressed air supply system including a compressed air control device according to FIG. 5 and the air drying device according to FIG. 3 according to a sixth exemplary embodiment of the invention.

FIG. 6 shows a circuit diagram of a compressed air supply system with the compressed air control device 2" of FIG. 5, which cooperates with the air drying device 8' of FIG. 3.

Figure 7:
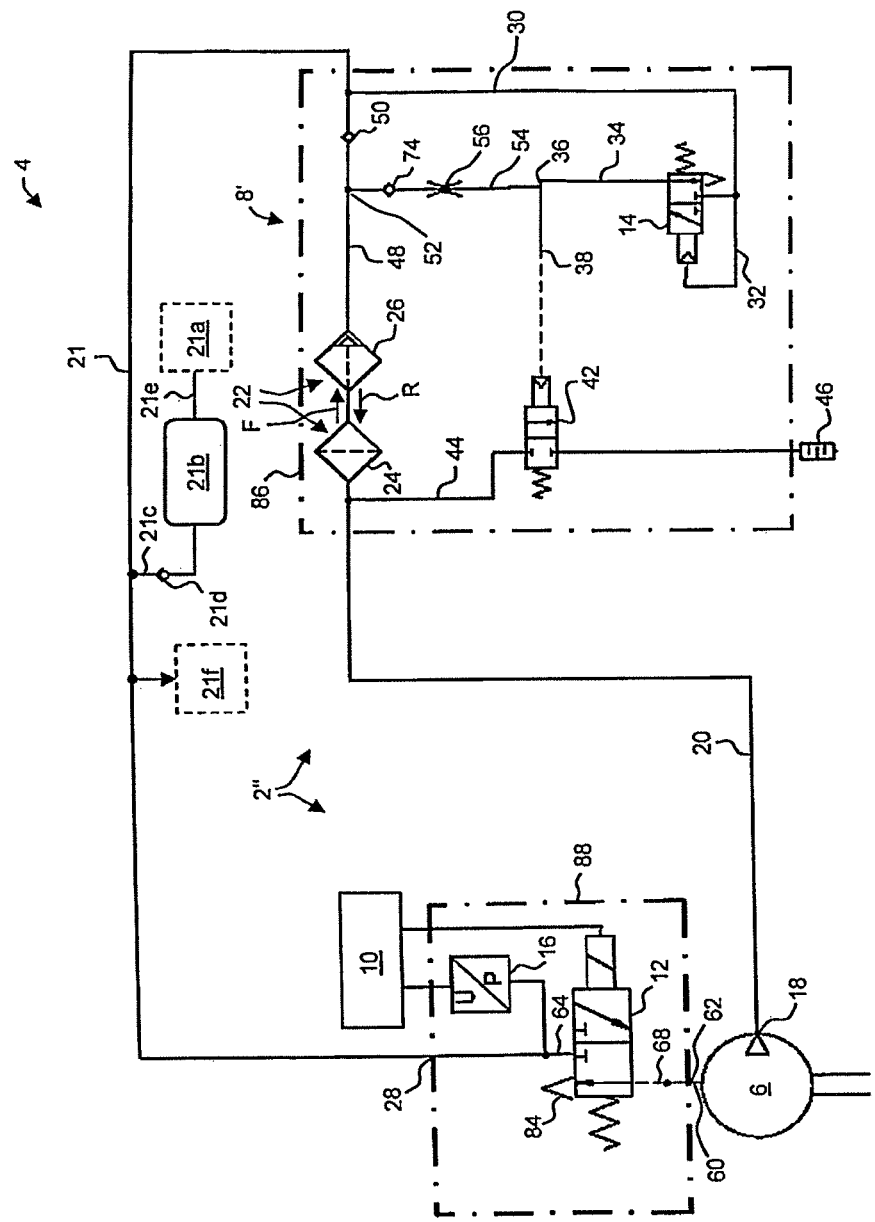
FIG. 7 shows a circuit diagram of a compressed air supply system including a compressed air control device and an air drying device as in the circuit diagram according to FIG. 6 but in a different structural arrangement according to a seventh exemplary embodiment of the invention.

FIG. 7 shows the control device 2" and the air drying device 8' of FIG. 6 in a different structural arrangement. In particular, a first structural unit comprising the ventilation control valve 14 is structurally integrated in one unit 86 with the air drying device 8' of FIG. 6. Also, the ventilation control outlet 36, the ventilation control line 38 and the control inlet of the air drying device 8' are integrated in the unit 86 and may be embodied together as a compressed air line. The supply control valve 12 is, however, arranged separately in a further structural unit 88 which is flanged to the compressor 6.

Figure 8:
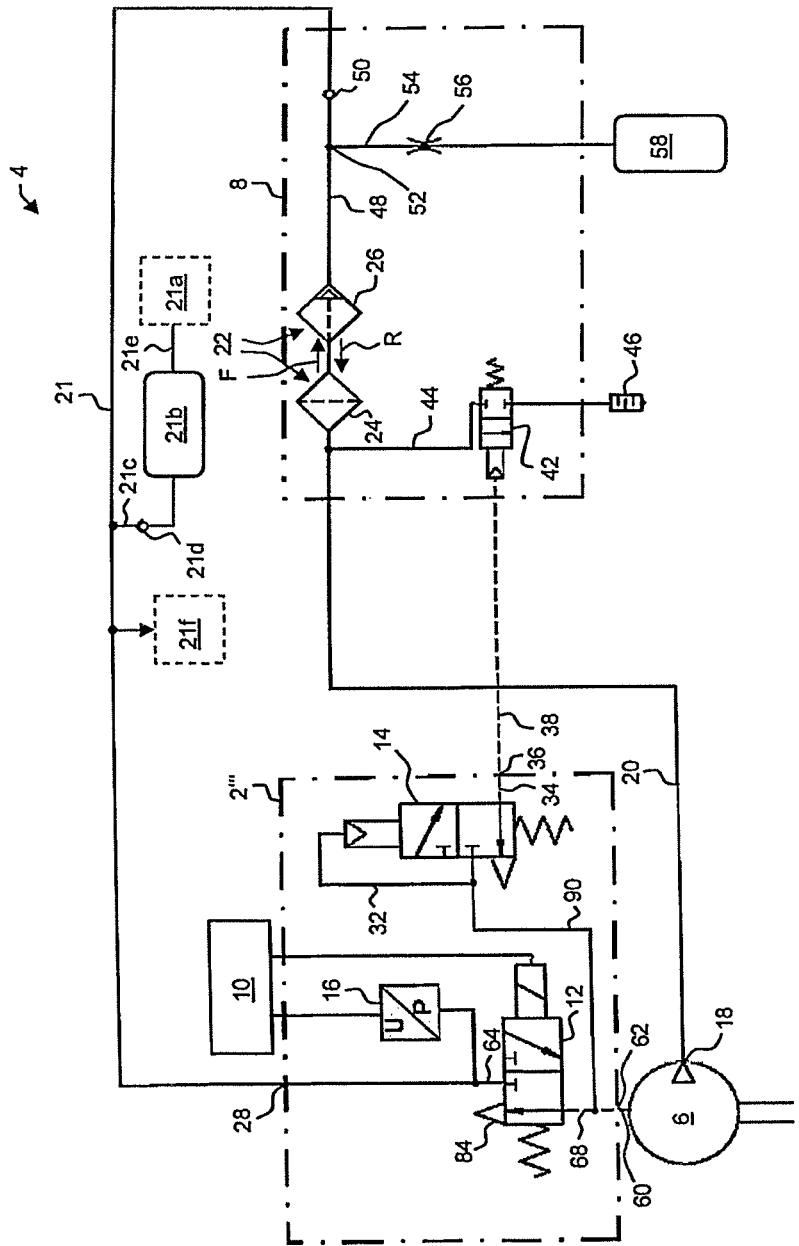
FIG. 8 shows a circuit diagram of a compressed air supply system including a compressed air control device having a different function from the compressed air control device of FIG. 5, according to an eighth exemplary embodiment of the invention.

FIG. 8 shows a circuit diagram of a compressed air supply system with a compressed air control device 2''' according to an eighth exemplary embodiment of the present invention in combination with the air drying device 8 of FIG. 1 to FIG. 5. The compressed air control device 2''' differs, in particular, from the compressed air control device 2" of FIG. 5 in that the ventilation control valve 14 is not connected via the compressed air line 30 to the system pressure inlet 28, but a pneumatic connection exists from the inlet and from the control inlet of the ventilation control valve 14 via a compressed air line 90 to the outlet of the supply control valve 12 and/or to the compressed air line 68 and to the compressor control outlet 62. The ventilation control valve 14 in this exemplary embodiment is, therefore, arranged downstream of the supply control valve 12. As a result, the pressure in the ventilation control line 38 reaches, at a maximum, the pressure in the compressor control line 60 and/or at the inlet of the compressor 6. This has the result that the air drying device 8 may only be transferred to the "regeneration" operating state when the compressor 6 does not deliver and/or is in the "holding" operating state.

Figure 9:
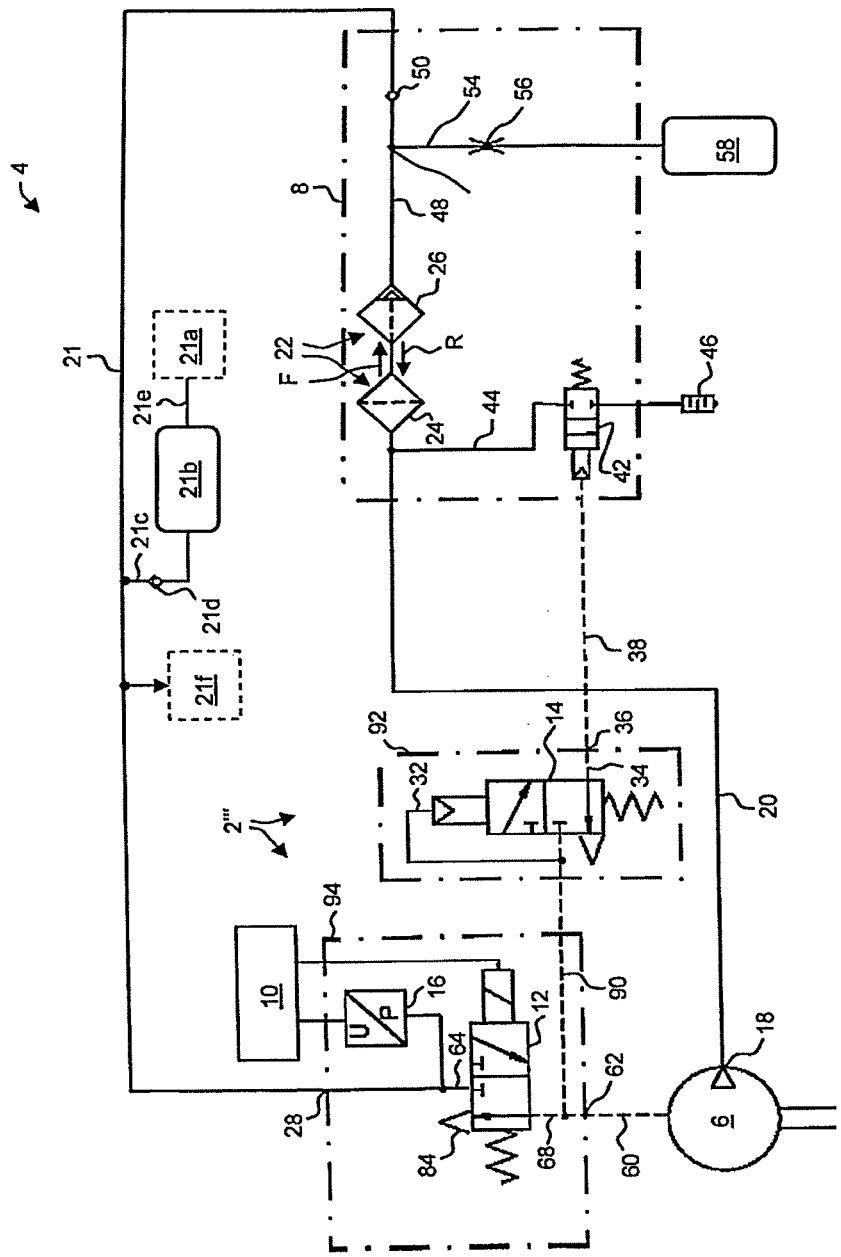
FIG. 9 shows a circuit diagram of a compressed air supply system including a compressed air control device according to FIG. 8, but in a different structural arrangement according to a ninth exemplary embodiment of the invention

FIG. 9 shows a circuit diagram of a compressed air supply system comprising the compressed air control device 2''' of FIG. 8, and the air drying device 8, the circuit diagram being functionally similar to the eighth exemplary embodiment of FIG. 8, However, the compressed air control device 2''' in this ninth exemplary embodiment is structurally divided up in contrast to FIG. 8, in particular, the ventilation control valve 14 is arranged in a first structural unit 92 and the supply control valve 12 in a second structural unit 94. Both structural units 92 and 94 may he mechanically connected together, in particular flanged to one another.

Figure 10:
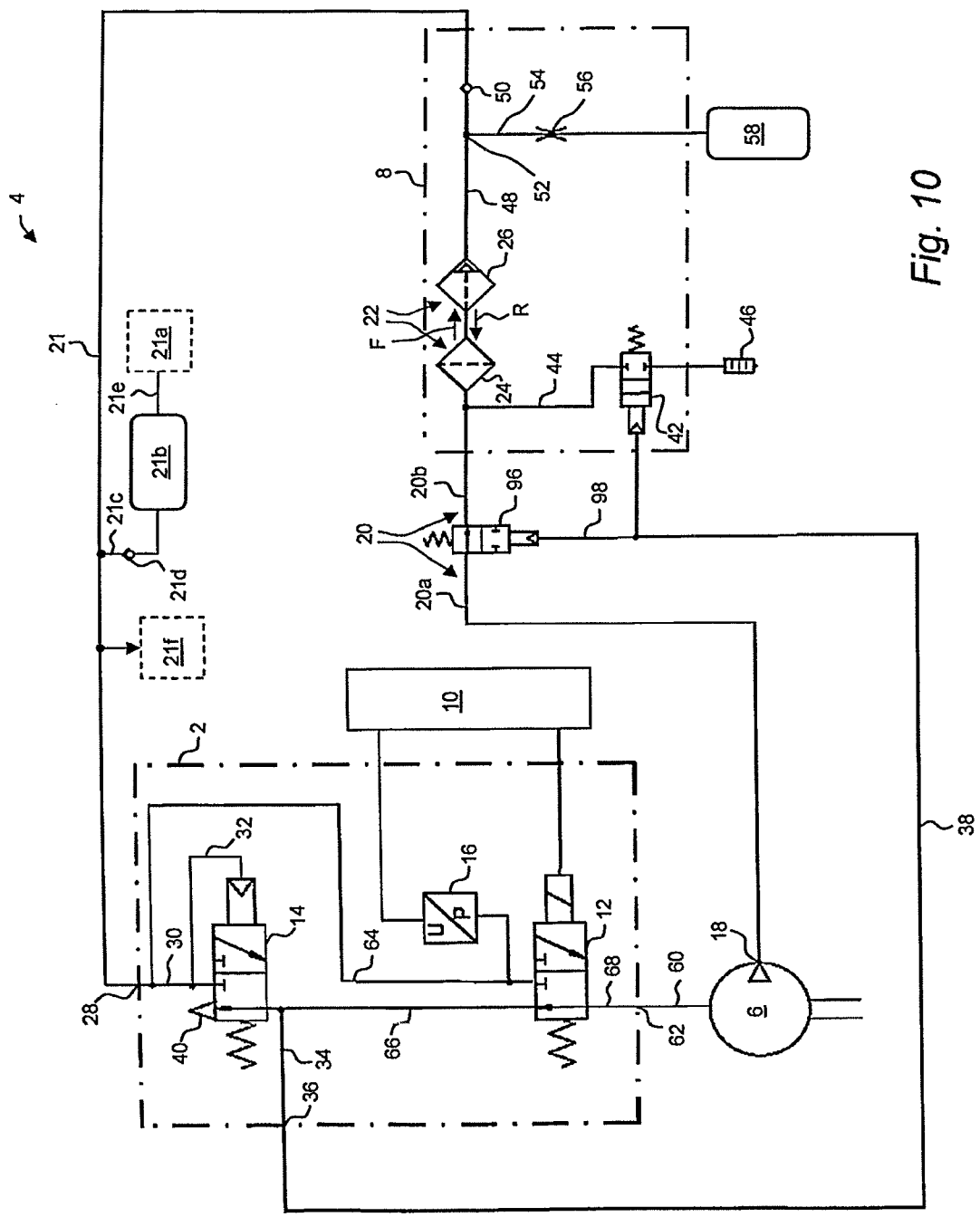
FIG. 10 shows a circuit diagram of a compressed air supply system including the compressed air control device and the air drying device according to FIG. 1 in a variant with an additional valve according to a tenth exemplary embodiment of the invention.

FIG. 10 shows a circuit diagram of a compressed air supply system with the compressed air control device 2 of FIG. 1 and the air drying device 8, the circuit diagram differing from the exemplary embodiment of FIG. 1, in particular, by an additional pneumatically actuatable ventilation valve 96. The ventilation valve 96 is arranged in the compressed air 20 between the compressor 6 and the air drying device 8, wherein by means of the ventilation valve 96 a part of the compressed air line 20 connected to the compressor 6, and/or a compressed air line 20a, can be pneumatically separated froth a part of the compressed air line 20 connected to the air drying device 8 and/or from a compressed air line 20b, This has the advantage that the compressed air from the line between the compressor 6 and air drying device 8 may be kept under pressure during the regeneration. In particular, in a compressor 8, which does not suction its air from the environment, but which is supplied from a turbocharger, the compressed air of the turbocharger is prevented via the compressor 8 and compressed air line 20 and the open ventilation valve 42 from discharging into the atmosphere. Thus, the entire compressed air of the turbocharger is available to an internal combustion engine without pressure losses in the air treatment system.

The aeration valve 96 can be substantially configured as the ventilation valve 42, but with reversed switching states. Switching pressures which have to be applied for switching the respective valve 42 and/or 96 against the force of the respective spring of the valve 42 and/or 96 are preferably the same but alternatively may also be different.

The control inlet of the aeration valve 96 is pneumatically connected via an aeration control line 98 to the ventilation control line 38. The aeration valve 96 can, therefore, be controlled by the ventilation control valve 14. If the ventilation control line 38 and the aeration control line 98 are vented, the compressed air lines 20a and 20b are pneumatically connected together by means of the aeration valve 96. As soon as the pressure in the ventilation control line 38 and the aeration control line 98 and/or at the control inlet of the aeration valve 96 reaches or exceeds an upper limit value, which in particular is set by the spring of the aeration valve 96, however, the aeration valve 96 switches from the first into its second switching state in which the compressed air line 20a is shut off from the compressed air line 20b.

If the ventilation valve 42 and the aeration valve 96 have the same limit values at which they are switched, and/or switch into their respective other switching state at the same control pressures, the air drying material 22 at a given time are thus either always connected by the compressed air line 20 to the compressor 6 or by the ventilation line 44 to the vent 46, but never pneumatically connected to the compressor 6 and the vent 46 at the same time, so that the compressor does not deliver compressed air directly and/or by bypassing the air drying material 22 to the vent 46.

As an alternative to the exemplary embodiment shown, the aeration valve 96 may also be integrated in the air drying device 8 and/or the ventilation valve 42 may be arranged outside the air drying device 8. In particular, when the same switching pressures are to be provided for the ventilation valve 42 and the aeration valve 96, instead of the combination of the ventilation valve 42 and the aeration valve 96, a single valve may be provided which pneumatically connects an inlet of the air drying material 22 in the delivery direction F and/or the ventilation line 44 depending on its switching state either to the compressed air line 20 and/or the compressor 6 or to the vent 46. This valve can be a 3/2-way valve and/or in particular apart from the required switching pressure of the same or similar configuration as the ventilation control valve 14. Such an aeration and ventilation valve, which is provided instead of the valves 42 and 96, may optionally be arranged outside the air drying device 8, bin is advantageously integrated in the air drying device 8.

It will be seen that the objects set forth above, among those made apparent from the preceding description, are efficiently attained, and since certain changes may be made without departing from the spirit and scope of the invention, it is intended that all matter contained in the above description or show in the accompanying drawing shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A compressed air control device for controlling operating states of a compressor and an air drying device, the control device comprising:
    a compressor control outlet pneumatically connectable to a control inlet of the compressor and configured to pneumatically switch an operating state of the compressor;
    a system pressure inlet pneumatically connectable to an outlet of the air drying device via a system pressure line that conducts compressed air at a system pressure produced by the compressor and dried by the air drying device;
    a ventilation control outlet pneumatically connectable to a control inlet of the air drying device and configured to pneumatically switch an operating state of the air drying device;
    a pneumatically actuatable ventilation control valve controllable by the system pressure to pneumatically couple the system pressure inlet to the ventilation control outlet to switch the operating state of the air drying device; and
    an electrically actuatable supply control valve configured to pneumatically couple the system pressure inlet to the compressor control outlet irrespective of the system pressure to switch the operating state of the compressor.

2. The compressed air control device as claimed in claim 1, wherein the supply control valve is configured to occupy first and second switching states, and wherein the compressor control outlet is (i) pneumatically connected to one of the ventilation control outlet and a vent when the supply control valve occupies the first switching state and (ii) pneumatically connected to the system pressure inlet when the supply control valve occupies the second switching state.

3. The compressed air control device as claimed in claim 1, further comprising a pressure sensor pneumatically connected to the system pressure inlet.

4. The compressed air control device as claimed in claim 1, wherein the compressed air control device is configured as one of a complete structural unit and as first and second structural units coupled to one another, wherein the first structural unit includes the ventilation control valve, and wherein the second structural unit includes the supply control valve and is connectable by a flange to the compressor.

5. A method for using the compressed air control device as claimed in claim 1 to control operating states of the compressor and the air drying device, the method comprising the steps of:
    controlling the supply control valve to pneumatically switch the operating state of the compressor via the compressor control outlet;
    drawing compressed air from the system pressure line via the system pressure inlet; and
    controlling the ventilation control valve based on the system pressure to pneumatically switch the operating state of the air drying device.

6. The compressed air control method as claimed in claim 5, wherein controlling the supply control valve comprises at least one of (i) controlling the supply control valve to occupy a first switching state such that the compressor control outlet is pneumatically connected to one of the ventilation control outlet and a vent and (ii) controlling the supply control valve to occupy a second switching state such that the compressor control outlet is pneumatically connected to the system pressure inlet.

7. The compressed air control method as claimed in claim 5, further comprising detecting the system pressure, wherein controlling the supply control valve is effected electrically, based at least in part on the detected system pressure.

8. The compressed air control method as claimed in claim 5, further comprising:
    when the air drying device is in a delivery operating state for increasing a control pressure, determining whether the air drying device is to be switched from the delivery operating state to a regeneration operating state for flushing the air drying device;
    in response to a determination that the air drying device is to be switched to the regeneration operating state, controlling the supply control valve such that the supply control valve remains in a first switching state until a switching threshold of the ventilation control valve is reached;
    in response to a determination that the air drying device is not to be switched to the regeneration operating state, controlling the supply control valve such that the supply control valve occupies a second switching state when the system pressure one of reaches and exceeds a predefined upper limit value that is lower than the switching threshold;
    when the supply control valve occupies the second switching state, determining whether the supply control valve is to be switched from a holding operating state to a delivering operating state; and
    in response to a determination that the compressor is to be switched to the delivering operating state, controlling the supply control valve to Occupy the first switching state when the system pressure falls to or below a lower limit value that is lower than the upper limit value.

9. An electronic control device for controlling the compressed air control device as claimed in claim 1, the electronic control device comprising:
- a decision component configured to:
  - determine whether the air drying device is to occupy a delivery operating state or a regeneration operating state; and
  - deciding, based on a result of the determination, whether the compressor is to remain in a the delivering operating state or a holding operating state; and
- a supply control valve activator configured to electrically control the supply control valve based on a result of the decision.

10. The electronic control device as claimed in claim 9, wherein:
- in response to a determination that the air drying device is to occupy the regeneration operating state, the supply control valve activator electrically controls the supply control valve such that the supply control valve remains in a first switching state until a switching threshold of the ventilation control valve is reached;
- in response to a determination that the air drying device is not to occupy the regeneration operating state, the supply control valve activator electrically controls the supply control valve such that the supply control valve occupies a second switching state when the system pressure one of reaches and exceeds a predefined upper limit value that is lower than the switching threshold;
- the decision component is further configured to determine whether the supply control valve is to be switched from the holding operating state to the delivering operating state when the supply control valve occupies the second switching state; and
- in response to a determination that the compressor is to he switched into the delivering operating state, the supply control valve activator electrically controls the supply control valve to occupy the first switching state when the system pressure falls to or below a lower limit value that is lower than the upper limit value.

11. The electronic control device as claimed in claim 9, wherein the electronic control device is integrated in an engine control device that electronically controls an internal combustion engine.

12. A compressed air supply system for a vehicle, the supply system comprising:
- the compressed air control device as claimed in claim 1;
- an electronic control device configured to electrically activate the supply control valve;
- the compressor having the control inlet pneumatically connected to the compressor control outlet;
- the system pressure line configured to receive compressed air from the compressor, the system pressure line being pneumatically connected to the system pressure inlet and comprising at least one connector configured to connect to at least one compressed air device of the vehicle; and
- the air drying device pneumatically connected between a compressed air outlet of the compressor and the system pressure line.

13. The compressed air supply system as claimed in claim 12,
wherein the air drying device comprises:
- an air drying material;
- a connecting line that connects the air drying material to the system pressure line;
- a flushing air connector coupled to a flushing air supply line;
- a non-return valve disposed in the connecting line between the flushing air connector and the system pressure line, the non-return valve being configured to prevent a return flow of compressed air from the system pressure line; and
- a pneumatically actuatable ventilation valve, the ventilation valve having a control inlet pneumatically connected to a ventilation control line, the ventilation valve being configured to connect and shut off a ventilation line to a vent depending on a pressure in the ventilation control line;
- wherein in a delivery operating state, the ventilation valve is shut off such that air flows through the air drying material in a delivery direction; and
- wherein in a regeneration operating state, the ventilation valve connects the ventilation line to the vent such that air flows through the air drying material to the vent in a regeneration direction opposite the delivery direction.

14. A method for using the compressed air supply system as claimed in claim 12, the method comprising the steps of:
- electrically controlling the supply control valve using the electronic control device to pneumatically switch the operating state of the compressor via the compressor control outlet; and
- controlling the ventilation control valve based on the system pressure line to pneumatically switch the operating state of the air drying device.

15. A method for using the compressed air supply system as claimed in claim 13, the method comprising the steps of:
- in the delivery operating state, shutting off the ventilation valve such that air flows through the air drying material in the delivery direction; and
- in the regeneration operating state pneumatically activating the ventilation valve via the ventilation control line such that the ventilation line is connected to the vent.

16. A vehicle comprising the compressed air supply system as claimed in claim 12; and
wherein the at least one compressed air device is coupled to the at least one connector of the system pressure line.

17. The compressed air control device as claimed in claim 1, wherein the system pressure inlet is pneumatically connectable to the outlet of the air drying device to further supply the compressed air provided by the compressor and dried by the air drying device to at least one of the control inlet of the air drying device and the control inlet of the compressor.

18. A compressed air control device for controlling operating states of a compressor and an air drying device, the control device comprising:
- a compressor control outlet pneumatically connectable to a control inlet of the compressor and configured to pneumatically switch an operating state of the compressor;
- a system pressure inlet pneumatically connectable to an outlet of the air drying device via a system pressure line that conducts compressed air at a system pressure produced by the compressor and dried by the air drying device;
- a ventilation control outlet pneumatically connectable to a control inlet of the air drying device and configured to pneumatically switch an operating state of the air drying device;
- a pneumatically actuatable ventilation control valve controllable by the system pressure to pneumatically couple, via an inlet and an outlet of the ventilation control valve, the system pressure inlet to the ventilation control outlet to switch the operating state of the air drying device; and an electrically actuatable supply control. valve configured to pneumatically couple the system pressure inlet to the compressor control outlet irrespective of the system pressure to switch the operating state of the compressor.

* * * * *